INVENTOR.
DAVID J. WATANABE
BY Dean Sandford
ATTORNEY

United States Patent Office 3,416,606
Patented Dec. 17, 1968

3,416,606
**HYDRAULIC FRACTURING OF TILTED
SUBTERRANEAN FORMATIONS**
David J. Watanabe, Orange, Calif., assignor to Union Oil
Company of California, Los Angeles, Calif., a corporation of California
Filed Mar. 25, 1966, Ser. No. 537,405
11 Claims. (Cl. 166—42)

ABSTRACT OF THE DISCLOSURE

A method of fracturing an inclined subterranean formation in which a fracturing fluid containing solid particles of low density diverting agent having a lower density than the fracturing fluid and solid particles of high density diverting agent having a higher density than the fracturing fluid is injected through a well and into contact with the formation at a pressure and volume flow rate sufficient to fracture the formation whereby the particles enter into the fracture so as to establish therein at a distance removed from the well flow diverting barriers updip and downdip from the well.

---

This invention relates to the hydraulic fracturing of tilted subterranean formations, and more particularly to a method of fracturing tilted subterranean formations so as to form fracture planes which are laterally distended generally normal to the axis of tilt. The invention also relates to improved methods of treating tilted subterranean formations under fracturing conditions, and to improved diverting agents having controlled densities both higher and lower than the density of the carrier liquid.

One of the problems encountered in the production of petroleum from underground petroliferous formations is that liquid petroleum contained in a reservoir rock of low permeability does not readily flow into a well that penetrates the reservoir rock. It is now well known in the art of petroleum production that the production rate and ultimate recovery of petroleum from low permeability formations can be substantially increased by fracturing the formation in the vicinity of the well. Although various methods of producing the desired fractures have been proposed, one of the most widely used techniques is to apply hydraulic pressure to the formation by injecting a fracturing liquid under elevated pressure through the borehole. When sufficient hydraulic pressure is applied to the formation, the rock will fracture, and by pumping the pressurizing fluid into the fracture at a rate exceeding the leak-off rate, the fracture can be extended to substantial distances from the well. It is also well known to add a particulate propping agent to the fracturing fluid for the purpose of introducing propping particles into the fracture. These propping agents serve to hold the fracture open and prevent reclosing or healing of the fracture when the hydraulic fracturing pressure is subsequently released. It is also well known to inject temporary sealing agents to seal off a fracture so that the fracturing step can be repeated. Thus, by successive fracturing and sealing operations, multiple fractures can be formed in a selected formation.

A formation subjected to hydraulic fracturing pressures in the aforedescribed manner will fracture, or open, along stress planes within the formation. While vertical fractures more or less parallel with the axis of the well can be formed in some formations, in the usual case it is accepted that the fractures are formed along the generally horizontal bedding planes. Although these bedding planes comprise substantially flat planes having generally horizontal orientations, due to geological phenomena they will usually be inclined or tilted from a true horizontal position. While in many structures the degree of inclination or tilt is relatively small, certain oil-bearing formations are tilted as much as 1000 feet or more of vertical distance per mile of horizontal distance. Accordingly, when a formation having a substantially inclined structure is fractured, the resulting fractures will usually be formed along the inclined bedding planes of the formation and will therefore be inclined in an amount defined by the formation tilt.

In theoretical treatments of fracturing theory, the fracture is usually considered to extend radially from the well bore a uniform distance in all directions, the fracture thus being assumed to have a circular configuration with the injection well at its center. However, in actual practice this idealized circular configuration is seldom realized, and in many cases not desired. Deviations from true circular configurations are the result of many factors, such as the location and magnitude of natural stress planes, the degree of formation tilt, and the fracturing technique employed. While natural stress planes vary from formation to formation, and even within the same formation, the result of fracturing a tilted formation by the techniques heretofore practiced is generally to produce a fracture substantially distended in the downdip direction with a corresponding reduction in fracture extension in the updip and lateral directions.

The problems of irregular fracture patterns are accentuated in tilted formations, both because the formation tilt promotes irregularities in the fracture pattern and because the consequences of improperly distended fractures can be substantially more detrimental than would normally be experienced in more horizontal formations. The typical oil reservoir will comprise an oil-bearing formation overlying either a hydrodynamic or static water bottom. If a well is drilled into the oil-bearing formation and conventional fracturing performed, it is highly probable that the fracture plane will extend into the downdip water zone, particularly since the fracture configuration will usually be abnormally distended in that direction. The fracture plane thus provides an open permeable communication from the water zone to the well bore. The beneficial effect of any natural water drive is minimized as the water flows from the water zone directly into the well, thus bypassing a substantial portion of the oil-bearing formation. As a consequence, the well will produce a high water/oil ratio and can become watered out at a relatively low ultimate recovery. Water production is generally further increased as the propping agents usually employed in conventional hydraulic fracturing are typically more dense than the fracturing fluid and will settle in the downdip section of the fracture, thus tending to prevent healing of the fracture with an attendant reduction in water flow. Although techniques of directing the propping agents into the updip section of the fracture have been proposed, they largely fail to prevent migration of the propping agent into the downdip section of the fracture, particularly in the more steeply tilted formations. Thus, while conventional fracturing can substantially increase the permeability of an oil-producing formation and provide a corresponding increase in oil production, it is frequently found that this increased oil production is accompanied by an undesired increase in water production.

Further undesirable consequences can result from undip overtreatment of tilted formations. In the first place, undip overtreatment reduces the extent of the more desirable lateral treatment and results in the establishment of permeable fractures extending undip from the well bore at elevations above the topmost perforations in the well casing or liner. Unless sufficient gas drive is available to cause the oil to flow downward to the perforated casing, the oil above the top perforations will be entrapped, necessitating the drilling of a second offset well in an undip location. Secondly, where the producing reservoir does have overlying gas zone, undip overtreatment can result in the extension of the fracture plane into the gas zone. Accordingly, a permeable communication is established from the gas zone to the well resulting in an undesirable increase in the producing gas/oil ratio and uneconomical diminishment of the natural gas drive. While the propping agent is usually incapable of forming a water-tight seal, accumulation of propping agent in the downdip fracture can offer sufficient resistance to force the fracturing fluid into the undip area of the fracture, thereby increasing the undesirable extension of the undip fracture.

A further problem is encountered with various well treating operations, such as acidizing, detergent and solvent washing, and additive injection, conducted on tilted formations under hydraulic fracturing conditions. The fluid patterns obtained by conventional injection techniques are distended in the downdip direction, thus contributing to a disproportionate loss of injected fluid into the downdip water zone. Since most of these treatments are directed to the increase of formation permeability, the permeability of the formation between the well bore and the water zone is thus undesirably increased resulting in increased water production.

Accordingly, it is an object of the present invention to provide an improved method of fracturing tilted formations. Another object is to provide a method of forming fracture planes in a tilted formation which are laterally distended in a direction generally normal to the axis of tilt. Another object is to provide a method of fracturing a tilted formation so as to preserve the natural hydrodynamic or basal water and gas drives. Still another object is to provide a method of fracturing tilted formations so as to minimize the production of water. A further object is to provide an improved method of treating wells under fracturing conditions. A still further object is to provide a controlled density diverting agent having densities ranging both higher and lower than the density of the carrier liquid. These and other objects of the present invention will become apparent to those skilled in the art from the following detailed description and by reference to the accompanying drawings, of which:

Figure 1:
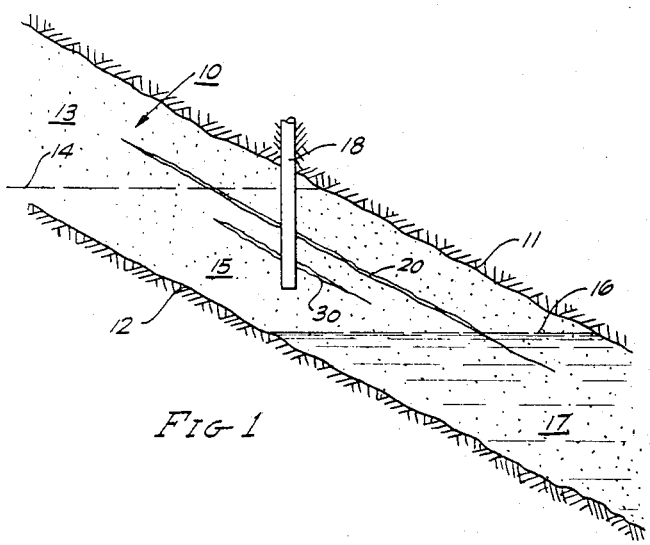
FIGURE 1 is a vertical section through a tilted subterranean oil-bearing formation having fractures formed by conventional methods and by the method of this invention.

In accordance with the method of this invention, a formation can be hydraulically fractured in a pattern laterally distended generally normal to the direction of tilt of the formation by adding high and low density particulate solid diverting agents to the injected fracturing fluid. The particle densities are selected so that the high density diverting agents are of higher density than the fracturing fluid, and the low density particles are less dense than the fluid. In this manner, a gravity separation will take place within the fracture wherein the low density diverting agent particles will largely be displaced into the updip section of the fracture and the high density diverting agent particles will settle to the downdip region below their point of entry into the formation. Under the high injection pressure employed, the diverting agent is compacted into the fracture to form an effective seal, thus causing diversion of the fracturing fluid laterally along a substantially horizontal plane generally normal to the direction of tilt of the formation thereby restricting the extension of the fracture in the undip and downdip directions. The injection of particulate propping agent into the updip and downdip regions is minimized to permit the formation to close upon the diverting agent on release of the hydraulic pressure. The diverting agent will thus function both to divert the fracturing fluid in a lateral direction and serve as a sealant upon completion of the fracturing operation, thereby preventing an influx of water and/or gas into the well. The aforedescribed technique can be employed to divert acid, detergent solution, solvent, additive solutions, and like liquids laterally in a direction generally normal to the direction of tilt of the formation.

The diverting agent employed in the method of this invention thus comprises a mixture of solid particles, some of which are characterized by a density lower than that of the carrier liquid so that the particles will float therein under quiescent conditions, while other of the particles are characterized by densities higher than that of the carrier liquid so that they will settle in the carrier liquid. These materials will hereinafter be referred to, respectively, as low and high density diverting agents, it being understood that the low density diverting agents exhibit densities lower than both the high density diverting agents and the carrier liquid, and that the high density diverting agents exhibit higher densities than either the low density diverting agents or the carrier liquid. In a preferred embodiment, the low density diverting agents have specific gravities at least 0.1 unit less than the specific gravity of the carrier liquid, and the high density diverting agents have specific gravities at least 0.1 unit above that of the carrier liquid. In another embodiment wherein a propping agent is also suspended in the carrier liquid, a high density diverting agent is preferred which is more dense than either the carrier liquid or the propping agent.

The diverting agent mixture is injected into the formation as a dispersion of particulate solids suspended in a pumpable carrier liquid. Carrier liquids suitable for this purpose can be any of the conventional aqueous or hydrocarbon base fracturing fluids, or other liquid sought to be injected under fracturing pressures. Thus, the diverting agent mixture can be suspended in water, viscous water containing a thickening agent, brine, aqueous acid solution, detergent solution, gelled hydrocarbon, crude oil, distillate petroleum fractions and various organic solvents.

Gravity separation of the particles within the fracture is enhanced by maintaining laminar flow of fluid in the fracture. Under conventional fracturing conditions, the fracturing fluid flow within the fracture is laminar. However, it is within the scope of this invention to control fracturing conditions to assure laminar flow rates.

Broadly, any particulate solid material of appropriate density and having the capability of forming an effective seal when deposited into the formation under fracturing pressures can be employed in the practice of this invention. However, since the undip and downdip fracture extensions are a function of the permeability of the diverting agent, superior results are obtained with diverting agents having sufficient resiliency to tightly pack into the fracture under fracturing pressures, thus providing a barrier substantially impermeable to the fracturing fluid, or other injected liquid. Further, compositions possessing the characteristic of slow solubility in the petroleum hydrocarbons encountered in oil-bearing zones of the formation and which are insoluble in water effect superior water shutoff without a corresponding permanent loss of oil permeability. Most of the conventional propping agents lack the resiliency and solubility characteristics required for a satisfactory diverting agent, the propping agents being primarily selected to form a permeable, insoluble, nonplugging mass when deposited in the fracture.

A preferred low density material particularly useful with carrier liquids having specific gravities of about 1.0, or higher, are various solid wax-polymer compositions such as those disclosed in my copending application Ser. No. 300,060 filed Aug. 5, 1963 and now issued as U.S. Patent No. 3,316,965. Other materials possessing low density characteristics and which can be suitably employed as diverting agents are solid particle-form polymer-alcohol compositions disclosed in application Ser. No. 454,713 filed May 10, 1965 and now issued as U.S. Patent No. 3,363,690, such as copolymer ethylene and methyl methacrylate admixed with stearyl alcohol, and certain of the lower density compositions disclosed in application Ser. No. 427,921 filed Jan. 25, 1965 and now issued as U.S. Patent No. 3,302,719, such as admixtures of polymer, wax and resin. Of this latter group, those compositions having resin contents below about 50 percent by weight are especially preferred as low density diverting agents. Although the classification of the diverting agents of this invention and the selection of a material useful in a specific application is dependent upon the density of the carrier liquid, materials generally useful as low density diverting agents in most applications have specific gravities less than about 0.95 referred to water, and usually within the range of between about 0.85 to about 0.90. The specific gravity of these diverting agents can be lowered by aerating the molten composition prior to solidification.

High density materials useful as diverting agents in the practice of this invention include the solid polymer-halogenated aromatic hydrocarbon compositions disclosed in application Ser. No. 455,297 filed May 12, 1965 and now issued as U.S. Patent No. 3,302,719, such as copolymer ethylene and methyl methacrylate admixed with dichlorobenzene. Other useful high density materials are certain polymer-wax-resin compositions disclosed in the aforementioned application Ser. No. 427,921, and particularly those compositions containing at least about 50 percent resin.

In a preferred embodiment of this invention, a diverting agent of controlled density can be prepared by dispersing a high density solid weighting material in a suitable solid binder, the density and proportion of the weighting material largely determining the density of the resulting mixture. Thus, by controlling the proportion of weighting material, mixtures of various predetermined densities can be obtained. The resiliency and solubility characteristics of the diverting agent are primarily controlled by the properties of the binding material. Among the various binder materials which can be employed are the various low and high density solid materials otherwise useful as diverting agents. A particularly preferred high density diverting agent possessing the desired properties of resiliency and solubility can be prepared by modifying the composition disclosed in the aforementioned copending application Ser. No. 300,060 to include a high density weighting material. The specific gravity of the low density wax-polymer composition can be increased from about 0.85–0.95 to a suitable level within the range of about 1.1 to about 5.0 by addition of the weighting ingredient.

Accordingly, compositions found particularly useful as low density diverting agents and as binder for high density diverting agents containing weighting ingredients include mixtures of polymer and hydrocarbon wax, and particularly compositions employing addition polymers having straight chain hydrocarbon units in their molecular structure. Preferred polymer materials comprise (1) addition polymers of an olefin having between two and four carbon atoms in the monomer molecule, such as polyethylene, polypropylene and polybutylene; (2) copolymers of an olefin having between two and four carbon atoms and an alkyl acrylate containing not more than four carbon atoms in the alkyl group, such as esters formed by the reaction of acrylic acid and an alcohol having no more than four carbon atoms; (3) copolymers of an olefin having between two and four carbon atoms and esters formed by the reaction of butenic acid and an alcohol having no more than four carbon atoms; and (4) copolymers of an olefin having between two and four carbon atoms and an ester formed by the reaction of acetic acid and an unsaturated alcohol having no more than four carbon atoms. Preferred polymer component materials include polyethylene, polypropylene, polybutylene, copolymers of ethylene and vinyl acetate, and copolymers of ethylene and ethyl acrylate, and ethylene and methyl methacrylate. A single polymer component, selected from the above classes of polymeric substances, may form the polymer component of my composition, or two or more such materials may be combined in the blend. Each of the aforesaid polymer components will impart somewhat different properties of strength, ductility, solubility, melting point and density to the final solid composition. Desired properties not obtainable with a single polymeric material can often be achieved by blends of two or more of these polymers. Although the solid particulate compositions of this invention may contain other polymeric materials, the term "polymer component" as used herein shall include materials selected from the aforesaid group of polymer and copolymer materials.

Suitable waxes for use in the diverting agents of this invention include crystalline and microcrystalline petroleum waxes, as well as beeswax, carnauba wax, condellila wax, montan wax, and the like. Preferred for many applications are the paraffinic petroleum waxes comprising primarily straight chain hydrocarbons of eighteen or more carbon atoms, many of which have melting points between about 130° F. and about 165° F. A particularly preferred paraffin wax comprises a fully refined petroleum paraffin crystalline wax having a melting point between about 130° F. and about 134° F. The solubility of the diverting agent can be controlled by employing mixtures of petroleum paraffin crystalline waxes having different melting points; such as, for example, mixtures of waxes melting within the standard melting point grades of 130–134° F., 143–145° F., and 161–165° F.

Generally, the weight ratio of wax to polymer component in the polymer-wax compositions useful as diverting agents will vary from about 199 to 1 to about 1 to 6. A preferred wax to polymer blend ratio found particularly useful in preparing low and high density diverting agents is from about 20 to 1 to about 1 to 1.

Barium lignin sulfonate is another relatively high density material useful as diverting agent, and which can be further increased in density by the addition of finely divided high density weighting material. Finely divided barite is especially preferred for weighting barium lignin sulfonate.

Materials useful in increasing the density of the various binder materials are relatively high density solid substances which may or may not possess solubility similar to that of the binder. Exemplary of these high density weighting agents are finely subdivided solid inorganic substances, such as for example particulate metal; metal compounds, such as the sulfates, oxides, halides, phosphates and carbonates of the various metals; and naturally occurring minerals. Specific materials found particularly suitable for weighting relatively low density diverting agents, such as for example the aforementioned wax-polymer compositions, are listed in Table 1.

TABLE 1.—TYPICAL HIGH DENSITY WEIGHTING MATERIALS

| Material | Chemical composition | Specific gravity |
| --- | --- | --- |
| Litharge | PbO | 9.53 |
| Lead oxide (Amor.) | PbO | 9.2–9.5 |
| Lead oxide (red lead) | $Pb_3O_4$ | 9.1 |
| Massicotite | PbO | 8.0 |
| Cerussite | $PbCO_3$ | 6.46–6.57 |
| Anglesite | $PbSO_4$ | 6.3–6.4 |
| Lead Carbonate (white lead) | $2PbCO_3 \cdot Pb(OH)_2$ | 6.14 |
| Barites | $BaSO_4$ | 4.3–4.6 |
| Witherite | $BaCO_3$ | 4.27–4.35 |
| Aragonite | $CaCO_3$ | 2.93 |
| Dolomite | $CaCO_3 \cdot MgCO_3$ | 2.8–2.9 |
| Calcite | $CaCO_3$ | 2.6–2.71 |

While the materials listed in Table 1 are typical of high density solids which can be employed in the practice of this invention, they are not intended as limiting the use of other high density solids to increase the density of a solid diverting agent composition.

Desirable weighting materials are those which are available in finely divided form, or which can be readily reduced in size on a commercial scale by simple techniques. The solid weighting materials must be of a size which can be dispersed in the binder, and must of necessity be of smaller size than the diverting agent particles. In most applications, weighting material particles within a uniform size range of less than 1 micron are preferred.

Among the high density solids useful as weighting materials, such as those listed in Table 1, solid materials which have specific gravities above about 4.0 with reference to water are particularly preferred. Of these, litharge is especially preferred, both because of its high density (9.53 specific gravity) and because it is commercially available as a finely divided product of less than 1.0 micron average particle size, and usually as relatively uniform particles having sizes within the range of about 0.25 to 0.5 micron.

The foregoing weighting materials can be admixed with a binder in amounts necessary to attain a resulting particulate solid material of the desired density, the maximum proportion of high density ingredient being limited by the amount of material required to obtain a cohesive particle of the requisite resiliency. The amount of weighting material which must be added depends upon the density of the binder, the desired product density, and the density of the weighting material. Typically, high density diverting agent compositions can be weighted by the addition of up to about 60 volume percent of the finely divided weighting material. Of course, these compositions can comprise substantially higher weight proportions of high density solid because of the density difference of the weighting material and the binder.

The low density diverting agents can be prepared by any of the techniques disclosed in the above-mentioned copending applications. The high density diverting agent compositions can be similarly prepared and particulated. In the preferred embodiment of this invention wherein a polymer-wax composition is weighted with suitable high density solid weighting material, finely divided particles of the high density solid are mixed in proper proportion into molten polymer-wax composition so as to obtain a uniform dispersion of solid in the liquid mass. The molten composition containing the dispersed solid weighting material is readily formable into solid particles of the desired size by several techniques such as prilling, dispersion, extrusion, etc.; or alternatively, the mass can be solidified by cooling and formed into particles by grinding, cutting, tearing, shredding, etc. Care must be taken in handling the molten material to prevent the entrapment of air which would tend to reduce the density of the solidified material.

Low and high density diverting agents produced in the above-described manner will generally comprise particles of various sizes. While the particle size distribution can be controlled to some extent by the manufacturing technique employed, it is often advantageous to classify the particles to obtain a product of graded sizes. Generally, particles found useful as diverting agents comprise those having sizes within the range of from about 1 micron to about 0.09 inch, these sizes passing a number 8 U.S. Standard screen. In specific applications, it is sometimes desirable to employ particles having sizes within a more limited range. In this regard, it is convenient to classify both the low and high density diverting agents into very fine particles having a size within the range of from about 1 micron to about 150 mesh, into an intermediate range of particle sizes from about 150 mesh to 20 mesh, and into larger particles having sizes within the range of from about 20 mesh to about 8 mesh. It is to be realized that in specific applications it can be advantageous to use particles having sizes smaller than 1 micron or larger than 8 mesh, although sizes within this range are usually found most desirable. Further, it may be advantageous to classify the diverting agent into size grades other than specifically disclosed above.

The high and low density diverting agents of this invention are simultaneously injected in conventional manner through the well and into the formation as a dispersion of finely divided solid in any of the aforementioned liquid carrier fluids. Alternatively, a mixture of high and low density diverting agents can be prepared and this mixture dispersed in the carrier liquid. In either case, it is usually advantageous to control the diverting agent proportion to obtain at least about 50 volume percent high density material. Injection can be accomplished through screens, slotted liners, perforate casing, or any manner of apparatus conventionally employed in the completion of wells in petroleum bearing formations. In the treatment of tilting formations it is generally desirable to disperse low density diverting agent in the carrier liquid in an amount between about 0.05 and about 2.0 pounds per gallon. Similarly, the high density diverting agent is added at a rate of between about 0.1 and about 4.0 pounds per gallon. Various other particulated solid substances can be dispersed in the carrier liquid, either together with the diverting agents or in sequential treatments either preceding or following injection of the diverting agents. Other solids which can be dispersed in the carrier liquid include fluid loss additives and any of the conventional solid propping agents, such as glass beads, walnut hulls, sand, and the like.

The use of low and high density diverting agent mixtures in the hydraulic fracturing of a tilted formation can best be described by reference to the drawings which illustrate the fracturing of a tilted formation by conventional technique and by the method of this invention. FIGURE 1 is a vertical section of an inclined petroleum-bearing formation 10 taken along a line parallel with the axis of tilt. Formation 10 is highly stratified with bedding planes substantially parallel to the upper and lower boundaries 11 and 12 of formation 10. The formation 10 is sealed off at some considerable distance to the left of FIGURE 1, as for example by fault, as is usual for a stratigraphic trap type of reservoir. Although any tilted formation can be treated by the method of this invention, the method is particularly effective in treating formations inclined at angles of at least 15 degrees from the horizontal. The upper portion of the reservoir may contain gas in the region 13, the gas-oil interface being indicated by the dashed line 14, below which there is oil saturation in the region 15 down to the oil-water contact 16, below which there is water in the region 17. Well 18 is drilled from the surface to a point penetrating formation 10. The well is either stopped short of water zone 17, or plugged back to a point above interface 16. In either case, well 18 is equipped with conventional cemented casing, not shown, and can be completed in the oil-bearing region 15 of formation 10 with screens, slotted liner, or perforated casing so as to provide communication from the reservoir into well 18.

When such a highly stratified steeply dipping formation is fractured, the fracture plane will usually parallel the stratification, i.e., the fracture produced will generally not be horizontal but will be substantially parallel to the formation bedding planes. The fracture 20 in formation 10 represents the fracture obtained by conventional hydraulic fracturing methods. It is apparent that an oblique fracture such as 20 may extend at its lower extremity into the water-bearing region 17 of formation 10, which is highly undesirable as the fracture then provides communication from the water zone to the well, as previously described. Similarly, fracture 20 extends in an updip direction a substantial distance from well 18, and it is apparent that the fracture can enter gas zone 13, as illustrated. Fracture 30 in formation 10 represents a fracture formed therein by the method of this invention. It is apparent from the illustration that the fracture 30 does not extend into either gas zone 13 or water zone 17 in the vicinity of the well.

Figure 2:
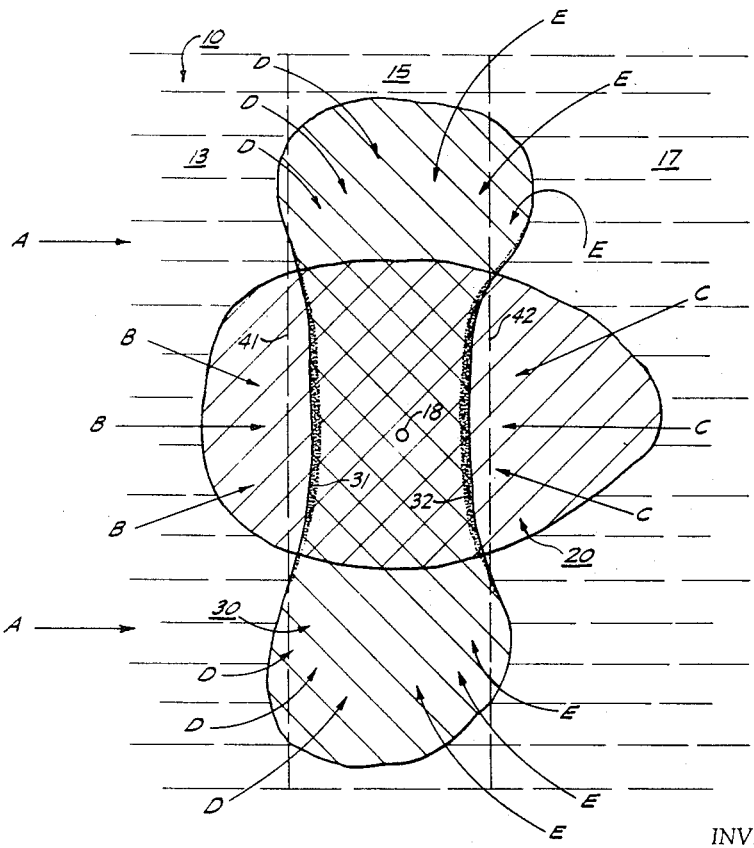
FIGURE 2 is a section through the fractured formation viewed from an angle normal to the oblique fracture planes.

The respective configurations of fracture planes 20 and 30 are better illustrated in FIGURE 2 which is a horizontal view of the formation 10 taken normal to the oblique fracture planes. For illustrative purposes, both fracture planes 20 and 30 are represented in the same plane. Fracture 20 can be seen with a characteristic oval shape distended in the downdip direction from well 18, this shape resulting from gravitational forces acting upon the fracture fluid. The direction of tilt is from the left hand side of the figure toward the right, as shown by the arrows A which indicate the downdip direction. Broken line 41 represents the intersection of the fracture plane with the gas-oil interface 14, and broken line 42 represents the intersection of the plane with the oil-water interface 16. Thus, in FIGURE 2, the left most portion of the bedding plane lies in gas zone 13 and the right portion thereof lies in water zone 17. The middle portion of the bedding plane lying between broken line 41 and broken line 42 is in oil zone 15.

Fracture plane 20, formed by conventional hydraulic fracturing technique, is seen extending from well 18 updip into gas zone 13 and downdip into water zone 17, thus providing permeable zones of communication from these respective regions to well 18. The path of gas flow from gas zone 13 to well 18 along fracture plane 20 is represented by arrows B. Similarly, the path of water flow along fracture plane 20 is represented by arrows C. Since these paths almost directly pass to well 18, it is apparent that upon fracturing by conventional techniques the well will produce high gas and water ratios. Not only are high gas and water ratios often economically unattractive, but the desirable natural gas and water drives tending to move the oil to the well bore can be depleted resulting in lower ultimate oil recovery.

These disadvantages are largely overcome with the fracturing technique of the present invention. FIGURE 2 also illustrates the configuration of fracture plane 30 formed by hydraulic fracturing with mixed high and low density diverting agents. In the illustrated example, fracture 30 is a substantially flat plane parallel to the inclined bedding planes of the formation which is distended normal to the direction of tilt so that the fracture plane lies largely within oil zone 15. Thus, fracture 30 has a major axis substantially normal to the direction of inclination of the formation and a minor axis substantially parallel thereto. It is readily apparent that although fracture planes 20 and 30 are approximately equivalent in area, fracture plane 30 has substantially greater area within the productive oil zone, thus providing a permeable communication from a large area of this zone to the well resulting in increased oil recovery. The formation of laterally distended fractures, such as illustrated at 30, has the secondary advantage that fewer wells must be drilled into the productive formation since the later spacing can be increased.

A further major advantage of laterally distended fractures is the minimization of gas and water production and better utilization of natural gas and water drives. This result is obtained because of the configuration of the fracture plane. In the vicinity of well 18, fracture plane 30 is restrained in the updip and downdip directions by the action of the diverting agents so that the fracture plane does not extend into gas zone 13 or water zone 17. Further, even if the fracture is extended into these zones, the compact mass of low density diverting agent packed into the upper periphery 31 of fracture 30, and the similar compact mass of high density diverting agent 32 along the downdip periphery of fracture 30 function as sealant to prevent the direct flow of gas and water to the well bore. Although diverting agent masses 31 and 32 are illustrated as relatively thinly distributed along the upper and lower peripheries of fracture 30, these masses can cover a substantial horizontal area of the fracture, depending on the quantity of diverting agent employed. Thus, in the case where a relatively large amount of diverting agent is employed, the compact masses 31 and 32 can extend substantially to well 18.

The diverting agent concentration in compact masses 31 and 32 is greatest immediately updip and downdip from well 18, thus offering the greatest restriction to fracturing fluid penetration in this area as evidenced by the fracture configuration. As fracture 30 is extended laterally, the diverting agent becomes more widely dispersed, thereby forming a less dense mass which permits an increasing degree of updip and downdip penetration causing the characteristic dumbbell shaped fracture pattern illustrated in FIGURE 2. As illustrated, the fracture can extend into gas zone 13 and water zone 17 at the more distant extremities of the fracture, usually without harm and frequently with a beneficial effect on oil production. This benefit occurs when the distended fracture communicates with either or both of gas zone 13 and water zone 17 at a point laterally remote from well 18. The natural gas and water drives then operate to move oil in oil zone 15 toward well 18, thus affording substantially improved sweeping of the oil reservoir. Hence, the breakthrough of both gas and water into well 18 is delayed, and substantially improved gas/oil and water/oil producing ratios obtained. The natural gas drive paths along fracture 30 are illustrated by arrows D in FIGURE 2. Arrows E illustrate the natural water drive paths along fracture 30.

Fracture 30 can be sealed by conventional oil-soluble plugging materials, and the fracturing operation repeated to form a second similar fracture. The newly formed fracture can in turn be plugged and subsequent fractures formed in the foregoing manner.

The fracturing method and diverting agent composition of this invention are further illustrated by the following examples describing various specific embodiments thereof, but which are not to be construed as limiting the scope of the invention.

EXAMPLE 1

The fracturing technique of this invention is demonstrated by the hydraulic fracturing of a well located in Big Horn County, Wyo. The well is completed in the Tensleep formation by conventional casing perforated between the interval 4702 and 4713 feet. The Tensleep sandstone is a sharply tilted formation with outcroppings at the 5000 foot level in the Big Horn Mountains to the northeast of the well, which is located at an elevation of approximately 1000 feet. The formation is tilted generally from the outcroppings toward the southwest, and is tilted at an inclination of about 600 feet per mile in the vicinity of the well. Because of the lithology of this structure, water apparently enters the formation at the elevated region and flows to the southwest. Oil reservoirs in this general area are the result of entrapment by the strong hydrodynamic forces existing because of the substantial elevation difference in the Tensleep formation between the outcroppings and the oil reservoirs.

Upon initial completion of the well, both the oil and water production rates are low. During this early period oil production averaged about 17 barrels per day and water production about 15 barrels per day. The producing zone is then fractured by conventional method. Oil production is increased to 88 barrels per day, however, a far larger increase in water production is experienced, the water production increasing to about 733 barrels per day.

This first fracture is plugged off and a second fracture job performed employing the improved method of this invention. The fracture is produced by the injection of a viscous aqueous fracturing fluid into the formation at a moderate injection rate of 7 barrels per minute. This initial fracturing fluid contains the following particulate solid additives in suspension:

| Amount, lbs./gal. | Size | Additive description |
|---|---|---|
| 0.30 | 150 mesh, 1 micron | Wax-polymer fluid loss additive. |
| 0.20 | 20–150 mesh | Low density wax-polymer agent. |
| 0.10 | 8–20 mesh | Do. |
| 0.25 | 20–40 mesh | Sand propping agent. |
| 1.00 | 150 mesh, 1 micron | High density wax-polymer diverting agent. |
| 0.50 | 20–150 mesh | Do. |

Upon the observation of a substantial pressure increase, the fluid injection is decreased to 4 barrels per minute with a corresponding reduction in solids addition to maintain the above concentrations. Upon reaching a rate of 4 barrels per minute at maximum pressure, the rate is then increased to 11 barrels per minute, and as the pressure is increased, the rate is reduced to 7 barrels per minute. The rate is successively raised to injection rates of 15, 19 and 23 barrels per minute with reductions of 4 barrels per minute in each case as the injection pressure reaches the maximum. The injection rate is then alternatively varied between 19 and 23 barrels per minute until the fracturing operation is complete. The fracturing fluid is displaced from the tubing and the well returned to service in conventional manner.

Fracturing of the producing formation in the aforementioned manner resulted in an increase of oil production to 150 barrels per day with a corresponding water production rate of 110 barrels per day.

EXAMPLE 2

A high density diverting agent is prepared according to the method of this invention. Approximately 75 parts by weight of litharge is added to a molten mixture of wax and copolymer ethylene and ethyl acrylate. The resulting dispersion of finely divided solid in liquid is particulated and solidified. The resulting product exhibits a specific gravity of about 3.0 referred to water.

EXAMPLE 3

A mixed density diverting agent is prepared by mixing approximately 40 volume percent of solid particles of a mixture of wax and copolymer ethylene-ethyl acrylate having a size within the range of 1 micron up to about 8 mesh with approximately 60 volume percent of a composition prepared according to Example 2 and having a similar size range. The low density diverting agent particles exhibit specific gravities of about 0.88 and the high density diverting agents exhibit specific gravities of about 3.0.

While particular embodiments of the invention have been described, it will be understood, of course, that the invention is not limited thereto since many modifications can be made, and it is intended to include within the invention any such modifications as fall within the scope of the claims.

The invention having thus been described, I claim:

1. A method of fracturing an inclined subterranean formation so as to form a laterally distended fracture having a major axis substantially normal to the direction of inclination of the formation and a minor axis substantially parallel thereto, which comprises:
   dispersing solid particle-form diverting agent in a fluid, said diverting agent comprising low density particles of lower density than said fluid and high density particles of higher density than said fluid; and
   injecting said fluid containing said dispersed diverting agent through said well and into contact with said formation at a pressure and volume flow rate sufficient to fracture said formation and to displace said particles into said fracture so as to establish therein at a distance removed from said well flow diverting barriers updip and downdip from said well.

2. The method defined in claim 1 wherein said formation is inclined at an angle of at least 15 degrees from the horizontal.

3. The method defined in claim 1 wherein said fluid containing said dispersed diverting agent flows within said fracture at a laminar rate of flow.

4. The method defined in claim 1 wherein said low density particles have specific gravities at least 0.1 unit below the specific gravity of said fluid.

5. The method defined in claim 1 wherein said high density particles have specific gravities at least 0.1 unit above the specific gravity of said fluid.

6. The method defined in claim 1 wherein a solid particle-form propping material is also dispersed in said fluid, and wherein said high density particles have specific gravities higher than said propping material.

7. The method defined in claim 1 wherein said low density particles are a resilient oil-soluble, water-insoluble solid mixture comprising wax and polymer.

8. The method defined in claim 1 wherein said high density particles are a resilient oil-soluble, water-insoluble solid mixture comprising wax and polymer weighted with finely divided particles of high density solid material dispersed in said solid mixture.

9. A method of injecting a treating fluid into an inclined petroleum-bearing formation penetrated by a well, which comprises:
   injecting said treating fluid through said well and into contact with said petroleum-bearing formation at a pressure and volume flow rate sufficient to fracture said formation;
   dispersing low density solid diverting agent particles of lower density than said treating fluid in said injected fluid to establish a substantially impermeable barrier in said fracture at a distance updip from said well so as to minimize the extension of said fracture in an updip direction;
   simultaneously therewith dispersing high density solid diverting agent particles of higher density than said treating fluid in said injected fluid to establish a substantially impermeable barrier in said fracture at a distance downdip from said well so as to minimize the extension of said fracture in a downdip direction; and
   continuing the injection of said fluid until a desired treatment is obtained.

10. A method of increasing the recovery of petroleum from an inclined petroleum-bearing formation situated above an underlying water-bearing formation and penetrated by a well, which comprises:
   injecting a fluid through said well and into contact with said petroleum-bearing formation at a pressure and volume flow rate sufficient to fracture said formation;
   establishing a substantially impermeable barrier of solid material in said fracture between said well and said underlying water-bearing formation by dispersing particles of a high density solid diverting agent in said injected fluid, said particles having a density higher than the density of said fluid; and
   thereafter producing petroleum from said petroleum-bearing formation.

11. A method of increasing the recovery of petroleum from an inclined petroleum-bearing formation situated between an underlying water-bearing formation and an overlying gas-bearing formation and penetrated by a well, which comprises:
   injecting a fluid through said well and into contact with said petroleum-bearing formation at a pressure and volume flow rate sufficient to fracture said formation;
   establishing a substantially impermeable barrier of solid material in said fracture between said well and said underlying water-bearing formation by dispersing particles of a high density solid diverting agent in said injected fluid, said particles having a density higher than the density of said fluid;

simultaneously therewith establishing a substantially impermeable barrier of solid material in said fracture between said well and said overlying gas-bearing formation by dispersing particles of a low density solid diverting agent in said injected fluid, said particles having a density lower than the density of said fluid; and thereafter producing petroleum from said petroleum-bearing formation.

References Cited

UNITED STATES PATENTS

| | | | |
|---|---|---|---|
| 3,127,937 | 4/1964 | McGuire et al. | 166—42.1 |
| 3,161,235 | 12/1964 | Carr | 166—42.1 X |
| 3,235,007 | 2/1966 | Kern et al. | 166—42.1 |
| 3,249,158 | 4/1966 | Kieschnick et al. | 166—42.1 X |
| 3,259,190 | 7/1066 | Parsons | 166—42.1 |
| 3,302,719 | 2/1967 | Fischer | 166—42.1 |

JAMES A. LEPPINK, *Primary Examiner.*